US012091295B2

(12) United States Patent
Omura

(10) Patent No.: US 12,091,295 B2
(45) Date of Patent: Sep. 17, 2024

(54) ELECTRIC CHAIN BLOCK

(71) Applicant: KITO CORPORATION, Yamanashi (JP)

(72) Inventor: Shinya Omura, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 197 days.

(21) Appl. No.: 17/910,004

(22) PCT Filed: Jan. 5, 2021

(86) PCT No.: PCT/JP2021/000089
§ 371 (c)(1),
(2) Date: Sep. 8, 2022

(87) PCT Pub. No.: WO2021/181846
PCT Pub. Date: Sep. 16, 2021

(65) Prior Publication Data

US 2023/0094932 A1 Mar. 30, 2023

(30) Foreign Application Priority Data

Mar. 9, 2020 (JP) ................................ 2020-040035

(51) Int. Cl.
*B66D 3/00* (2006.01)
*B66D 3/16* (2006.01)
*B66D 3/20* (2006.01)

(52) U.S. Cl.
CPC ................. *B66D 3/20* (2013.01); *B66D 3/16* (2013.01)

(58) Field of Classification Search
CPC ............... B66D 3/16; B66D 3/20; B66D 3/26
See application file for complete search history.

(56) References Cited

U.S. PATENT DOCUMENTS 7,441,749 B2 * 10/2008 Beaudoin ................. B66D 3/16 254/358
2004/0211951 A1 * 10/2004 Rosati ...................... B66D 3/16 254/358

(Continued)

FOREIGN PATENT DOCUMENTS

JP 49-94061 U 8/1974
JP 52-148674 U 11/1977

(Continued)

OTHER PUBLICATIONS

International Search Report and Written Opinion mailed on Feb. 22, 2021, received for PCT Application PCT/JP2021/000089, filed on Jan. 5, 2021, 9 pages including English Translation.

*Primary Examiner* — Emmanuel M Marcelo
(74) *Attorney, Agent, or Firm* — XSENSUS LLP

(57) ABSTRACT

An electric chain block comprising: a main body part; a bucket-mounting bracket including a bucket-mounting part to which a chain bucket for housing a load chain is mounted, wherein: the main body part is provided with a side surface chain entry/exit port, and a shaft recessed part in which a shaft hole for inserting a linking shaft for mounting the upper hook to the main body part opens, and which is recessed from the side surface; the bucket-mounting bracket is provided with a fixing flange part, and a bucket-mounting part which projects to an opposite side to the fixing flange part: and the shaft recessed part is provided with a mounting seat which the fixing flange part is brought into contact with in a direction crossing a first wall surface in which the shaft hole opens and fixed to by a fixer (e.g., a fixing means).

9 Claims, 8 Drawing Sheets

(56) References Cited

U.S. PATENT DOCUMENTS

| | | | | |
|---|---|---|---|---|
| 2015/0090946 | A1 | 4/2015 | Schwaiger | |
| 2016/0031684 | A1* | 2/2016 | Weingartner ............ | B66D 1/36 254/389 |
| 2023/0138172 | A1* | 5/2023 | Omura ..................... | B66D 3/16 254/358 |

FOREIGN PATENT DOCUMENTS

| | | | |
|---|---|---|---|
| JP | 2001-72386 | A | 3/2001 |
| JP | 2010-132454 | A | 6/2010 |
| JP | 2016-55979 | A | 4/2016 |
| JP | 2019-535613 | A | 12/2019 |

* cited by examiner

ELECTRIC CHAIN BLOCK

CROSS-REFERENCE TO RELATED APPLICATIONS

The present application is a 371 of PCT filing PCT/JP2021/000089, filed Jan. 5, 2021, which claims the priority to Japanese Patent Application No. 2020-040035, filed on Mar. 9, 2020, the entire contents of each are incorporated herein by reference.

TECHNICAL FIELD

The present invention relates to an electric chain block.

Background Art

Examples of an electric chain block which raises and lowers a cargo using a driving force of a motor include a model (reversible type) coping with both a normal suspension in which an upper hook is hung on a ceiling side and a lower hook is raised and lowered, and an inverted suspension in which the lower hook is hung on the ceiling side and a main body part of the electric chain block is raised and lowered, as illustrated, for example, in Patent Literature 1. Patent Literature 1 discloses the reversible type electric chain block, and a pair of brackets (12) are mounted to the main body part and a chain bucket (15) is mounted via the brackets (12) in the reversible type electric chain block.

The bracket (12) is provided with a flange (13) made by bending its end surface toward a side (outer side) away from the main body part, and the flange (13) is provided with a long hole (14). A suspension hook (16) of the chain bucket (15) is hung on the long hole (14). This can bring about a state in which the chain bucket (15) is arranged on the lower hook side in the normal suspension, and a state in which the chain bucket (15) is arranged on the upper hook side in the inverted suspension. In any of the normal suspension and the inverted suspension, a chain can be housed in the chain bucket (15).

Further, a bottom surface side of the main body part (surface on the lower hook side) is provided with a delivery port for delivering the chain, and an arc-shaped guide (3) is provided in the vicinity of the delivery port. The arc-shaped guide (3) is arranged between the pair of brackets (12), and well guides the chain delivered from the delivery port going toward the chain bucket (15). Note that since a slide resistance occurs if the chain comes into contact with the arc-shaped guide (3) in the normal suspension, the arc-shaped guide (3) is arranged at a position away from a path in which the chain hangs down (on the outside of the hanging down path) in the normal suspension.

CITATION LIST

Patent Literature

{PTL 1} JP 2004-99189 A

SUMMARY OF INVENTION

Technical Problem

Incidentally, in the configuration disclosed in Patent Literature 1, to make a configuration in which the chain does not come into contact with the arc-shaped guide (3) in the normal suspension, the chain passing through the arc-shaped guide (3) separates from the side surface of the main body part. Accordingly, the brackets (12) to which the chain bucket (15) is mounted while guiding the chain are in a state of largely projecting from the side surface of the main body part. This hinders the electric chain block from being made compact, and the largely projecting brackets (12) impair the design quality.

Further, as explained above, in the case where the chain separates from the side surface of the main body part and the brackets (12) also separate from the main body part, the chain is not housed in the chain bucket (15) and possibly hangs down in a state of protruding from the chain bucket (15) due to, for example, a swing of the main body part and the chain bucket (15) or other factors.

Besides, in the inverted suspension, the chain hangs downward from the arc-shaped guide (3), and the chain is possibly caught by the brackets (12) or another bulging section.

The present invention has been made in consideration of the above circumstances, and has an object to provide an electric chain block in which a bucket-mounting bracket can be made compact, and which has high design quality with less unevenness and can improve the storability of a load chain into a chain bucket.

Solution to Problem

To solve the above problem, according to a first viewpoint of the present invention, there is provided an electric chain block for raising or lowering a cargo hung on an upper hook or a lower hook by rotating a load sheave by driving of a motor, the electric chain block including: a main body part including the motor and the load sheave rotated by the motor; a bucket-mounting bracket including a bucket-mounting part to which a chain bucket for housing a load chain on a no-load side is mounted; and a fixing means for fixing the bucket-mounting bracket to the main body part, wherein: the main body part is provided with a side surface chain entry/exit port for the load chain on the no-load side to enter/exit the inside of the main body part from/to a side surface of the main body part, and a shaft recessed part in which a shaft hole for inserting a linking shaft for mounting the upper hook to the main body part opens, and which is recessed from the side surface; the bucket-mounting bracket is provided with a side surface contact part which comes into contact with the side surface, a fixing flange part which projects in a direction crossing the side surface contact part, and a bucket-mounting part which projects to an opposite side to the fixing flange part; and the shaft recessed part is provided with a mounting seat which the fixing flange part is brought into contact with in a direction crossing a first wall surface in which the shaft hole opens and fixed to by the fixing means.

Further, in the above embodiment, it is preferable that when the fixing flange part is fixed to the mounting seat by the fixing means, the fixing flange part is arranged at a position where the fixing flange part interferes with an axial direction of the shaft hole.

Further, in the above embodiment, it is preferable that the mounting seat is an end face part of a boss projecting from a bottom surface of the shaft recessed part, and a pair of the bosses are provided in a state of not hindering insertion of the linking shaft into the shaft hole and across the opening of the shaft hole.

Further, in the above embodiment, it is preferable that the main body part is provided with a locking part which opens on a side closer to the shaft recessed part than the side surface chain entry/exit port and to which a part of the bucket-mounting bracket is locked, and the bucket-mounting bracket is provided with a movement restriction part which projects to an inner side of the main body part more than the side surface contact part and is locked to the locking part.

Further, in the above embodiment, it is preferable that the movement restriction part is provided with a hooking part which projects to an inner side of the main body part via a step with respect to the side surface contact part, the locking part is provided with a locking recessed part and a locking projecting part, the locking recessed part is a portion which the hooking part enters, the locking projecting part is provided projecting from the locking recessed part, and the hooking part comes into contact with an inner wall surface of the locking projecting part on the locking recessed part side to restrict movement of the bucket-mounting bracket in a direction away from the side surface.

Further, in the above embodiment, it is preferable that the bucket-mounting part has mounting arms projecting in directions away from the side surfaces on both end sides of the side surface contact part in a width direction perpendicular to a vertical direction in which the cargo is raised and lowered and has mounting holes in long hole shapes surrounded by the mounting arms, and the chain bucket is supported via a coupling tool inserted into the mounting holes.

Further, in the above embodiment, it is preferable that the bucket-mounting part includes a mounting base part projecting in a direction away from the side surface at an end portion of the side surface contact part on the side surface chain entry/exit port side, and the mounting base part is provided with a support shaft part which a shaft hole penetrates and the chain bucket is supported via a bucket support shaft inserted into the shaft hole.

Further, in the above embodiment, it is preferable that the main body part includes a body which houses the motor and a guide member which is integrally mounted to the body, and the guide member includes: a first guide part which guides the load chain toward the lower hook; a second guide part which includes the side surface chain entry/exit port and guides the load chain toward the side surface chain entry/exit port; and a chain restriction part which is provided between the first guide part and the second guide part, enters a chain pocket of the load sheave in a state of not hindering rotation of the load sheave, and hinders the load chain from moving between the first guide part and the second guide part on the no-load side of the load sheave.

Further, in the above embodiment, it is preferable that the locking part is located above the side surface chain entry/exit port of the guide member in a normal suspension.

Advantageous Effects of Invention

According to the present invention, it is possible to provide an electric chain block in which a bucket-mounting bracket can be made compact, and which has high design quality with less unevenness and can improve the storability of a load chain into a chain bucket.

DESCRIPTION OF EMBODIMENTS

Hereinafter, an electric chain block 10 according to an embodiment of the present invention will be explained with reference to the drawings. Note that in the following explanation, a Z-direction represents a direction in which a load chain C1 is suspended, and a Z1 side represents a side where an upper hook 70 is located and a Z2 side represents a side opposite thereto where a lower hook 80 is located. Accordingly, the Z1 side represents the upper side and the Z2 side represents the lower side in a normal suspension, whereas the Z1 side represents the lower side and the Z2 side represents the upper side in an inverted suspension. However, in this description, the Z1 side represents the upper side and the Z2 side represents the lower side unless otherwise stated.

Figure 1:
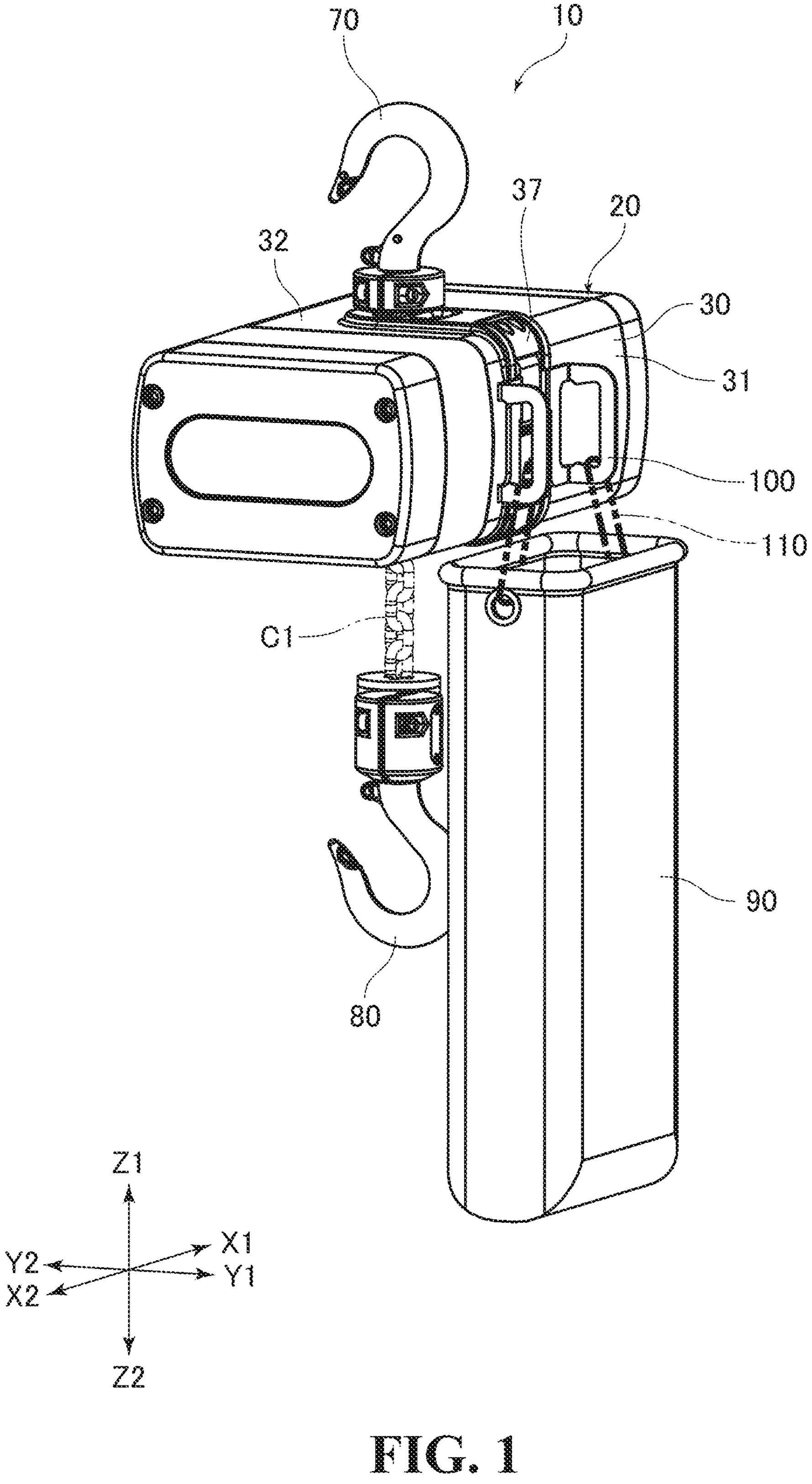
FIG. 1 is a perspective view illustrating a configuration of an electric chain block according to an embodiment of the present invention.

Further, an X-direction represents a long side direction of a main body part 20, and an X1 side represents a right side in FIG. 1 and an X2 side represents a left side opposite thereto. Further, a Y-direction represents a direction perpendicular to the Z-direction and to the X-direction, and a Y1 side represents a front side in FIG. 1 and a Y2 side represents a side opposite thereto.

<Regarding the Overall Configuration of the Chain Block>

Figure 2:
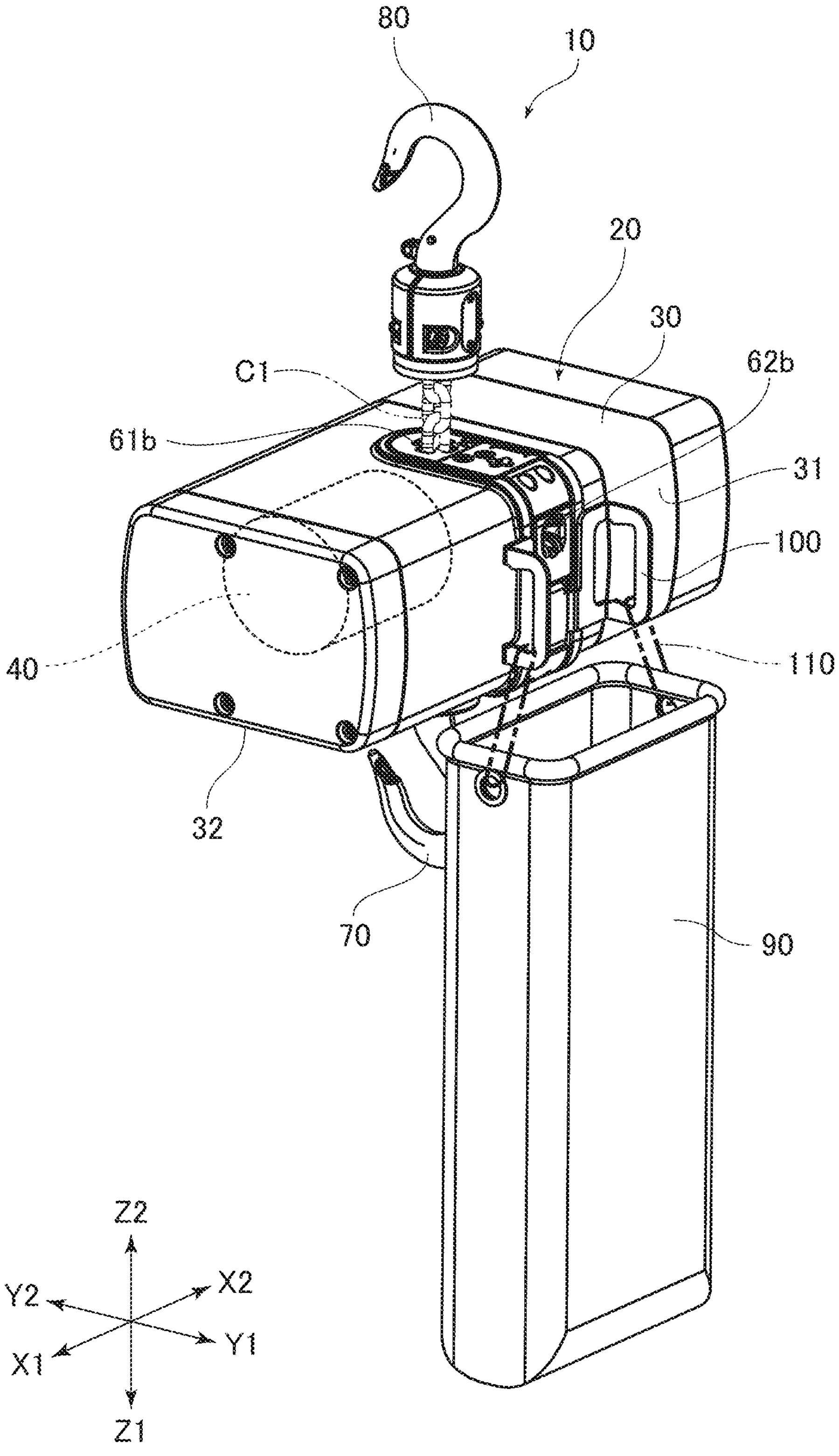
FIG. 2 is a perspective view illustrating an inverted suspension state in the electric chain block illustrated in FIG. 1.
Figure 3:
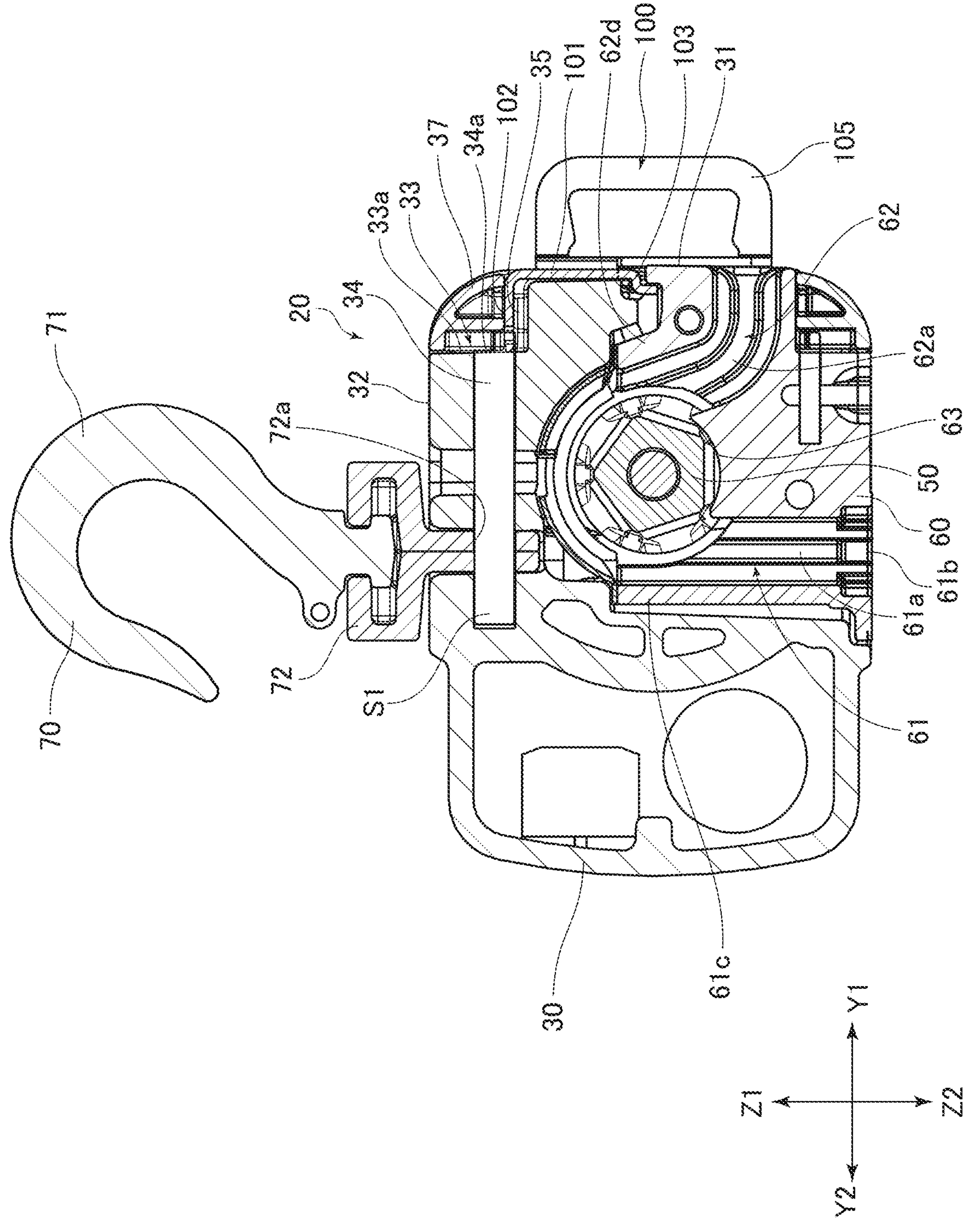
FIG. 3 is a cross-sectional view illustrating a configuration in the vicinity of a load sheave of the electric chain block illustrated in FIG. 1.

FIG. 1 is a perspective view illustrating a configuration of the electric chain block 10 according to an embodiment of the present invention. FIG. 2 is a perspective view illustrating a state of the inverted suspension in the electric chain block 10 illustrated in FIG. 1. FIG. 3 is a cross-sectional view illustrating the configuration in the vicinity of a load sheave 50 of the electric chain block 10 illustrated in FIG. 1. As illustrated in FIG. 1, the electric chain block 10 includes the main body part 20, the upper hook 70, the lower hook 80, a chain bucket 90, and a bucket-mounting bracket 100.

<Regarding the Main Body Part 20>

The main body part 20 has a body 30, a motor 40, a load sheave 50, and a guide member 60 as primary components. Among them, the body 30 and the guide member 60 are integrally fixed by bolts or the like to constitute one housing.

<Regarding the Body 30>

The body 30 is formed of, for example, an aluminum-based metal or an iron-based metal as a material. As illustrated in FIG. 3, the body 30 has a portion which forms an outer surface such as a side surface 31 and a top surface 32, and a structure portion present inside the outer surface. Further, though the body 30 is recessed from the outer surface at a section to which the later-explained guide member 60 is to be mounted, the main body part 20 is configured in a state almost without a recess when the guide member 60 is mounted to the body 30.

Inside the body 30, the motor 40 and the load sheave 50 are provided in a state of not being exposed to the outside. Further, to the body 30, the guide member 60 for guiding feed of the load chain C1 is also mounted. Note that the guide member 60 is a separate component from the body 30 in the configuration illustrated in FIG. 3, but the guide member 60 may be integrated with the body 30 (may be the same component as the body 30).

Figure 4:
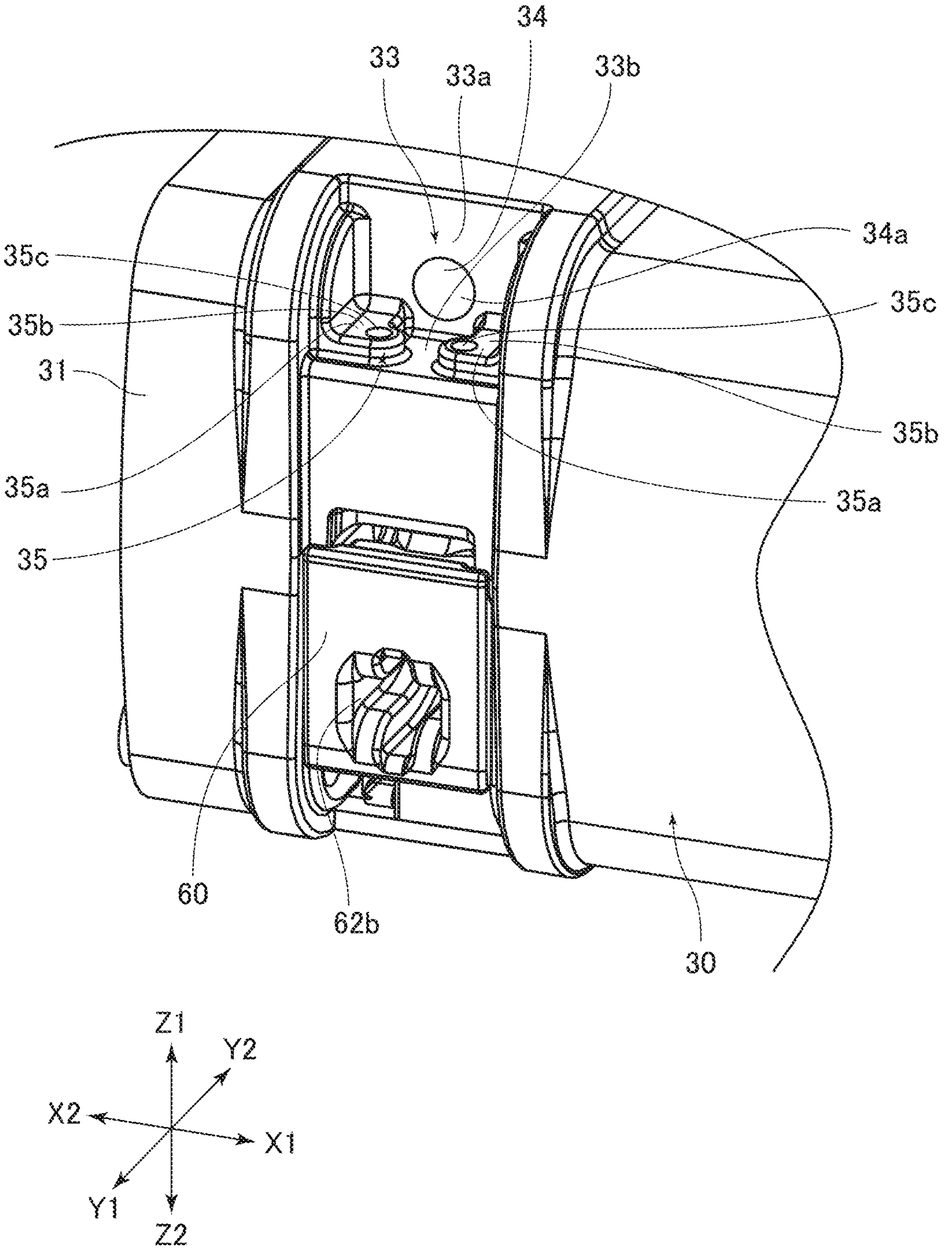
FIG. 4 is a partial perspective view illustrating a configuration in the vicinity of a shaft recessed part of a body of the electric chain block illustrated in FIG. 1.

Further, to the body 30, the upper hook 70 is mounted via a later-explained link shaft S1. More specifically, as illustrated in FIG. 3, the body 30 is provided with a shaft recessed part 33 recessed from the side surface 31 and the top surface 32. FIG. 4 is a partial perspective view illustrating a configuration in the vicinity of the shaft recessed part 33 of the body 30. As illustrated in FIG. 3 and FIG. 4, the shaft recessed part 33 is provided on an edge portion on the upper hook 70 side of the body 30. In the shaft recessed part 33, an opening 34*a* of the shaft hole 34 and a mounting seat 35 are provided. The shaft hole 34 is a bottomed hole portion for inserting the link shaft S1, and is formed toward the Y-direction from a surface on the deep side of the shaft recessed part 33 viewed from the side surface 31 (referred to as an "internal side surface 33*a*" in the following explanation; corresponding to a first wall surface).

Further, the mounting seat 35 is a portion which a fixing flange part 102 of a later-explained bucket-mounting bracket 100 is brought into contact with and fixed to. This brings about a state where the upper side (Z1 side) on the bucket-mounting bracket 100 side is fixed to the body 30 (main body part 20). Note that in this embodiment, the mounting seat 35 is an end face part 35*b* of a boss 35*a* projecting from a surface on the Z2 side of the shaft recessed part 33 (referred to as a "bottom surface 33*b*" in the following explanation).

Note that a pair of the bosses 35*a* are arranged across the opening 34*a* of the shaft hole 34, and the arrangement of the pair of bosses 35*a* has an interval so as not to hinder the insertion of the link shaft S1 into the shaft hole 34. Further, in the end face part 35*b* of the boss 35*a*, a screw hole 35*c* is opened. Into the screw hole 35*c*, a fixing means such as a screw is screwed, and the fixing means such as a screw fixes the later-explained fixing flange part 102.

In the case where the later-explained fixing flange part 102 is brought into contact with the end face parts 35*b* of the pair of bosses 35*a*, the fixing flange part 102 prevents the link shaft S1 from coming off the shaft hole 34. In other words, the height position of the end face part 35*b* from the bottom surface 33*b* is provided at a height position at a level where the fixing flange part 102 can hinder the link shaft S1 from coming off the shaft hole 34.

The height position of the end face part 35*b* from the bottom surface 33*b* as in the above is preferably located at the same level as the height position on the lowest side (Z2 side; the lower hook 80 side) in the Z-direction of the shaft hole 34, or on the upper side (Z1 side; the upper hook 70 side). In this case, mounting the fixing flange part 102 to the mounting seat 35 with the link shaft S1 inserted into the shaft hole 34 can realize a state where the fixing flange part 102 collides with the end portion of the link shaft S1. Accordingly, the fixing flange part 102 becomes a state of serving also as a function of preventing the link shaft S1 from coming off the shaft hole 34. In this case, a line linking the end face parts 35*b* of the pair of bosses 35*a* crosses the opening 34*a* in a plan view of the opening 34*a*.

Note that when the thickness of the later-explained fixing flange part 102 is sufficiently large, the line linking the end face parts 35*b* of the pair of bosses 35*a* does not have to cross the opening 34*a*. In this case, it becomes possible to hinder the link shaft S1 from coming off the shaft hole 34. Note that the end face part 35*b* constituting the mounting seat 35 is provided in a plane crossing the internal side surface 33*a* formed with the opening 34*a*.

<Regarding the Motor 40 and the Load Sheave 50>

Further, inside the body 30, the driving force from the motor 40 is transmitted to the load sheave 50. The load sheave 50 includes a plurality of chain pockets 51, and a metal ring of the load chain C1 can fit into the chain pockets 51. Accordingly, driving of the motor 40 enables hoisting and lowering of the load chain C1.

<Regarding the Guide Member 60>

The guide member 60 constitutes, together with the above-explained body 30, a structure portion of the main body part 20. As illustrated in FIG. 3, the guide member 60 is provided in a manner to be close to the load sheave 50 at predetermined positions (a first position and a second position). Thus, the load chain C1 is fed out while well fitting into the chain pocket 51 located in a prescribed angle range in the body 30. Note that the guide member 60 is composed of a block body of metal having abrasion resistance and having strength, such as carbon steel, alloy steel, or the like.

Figure 5:
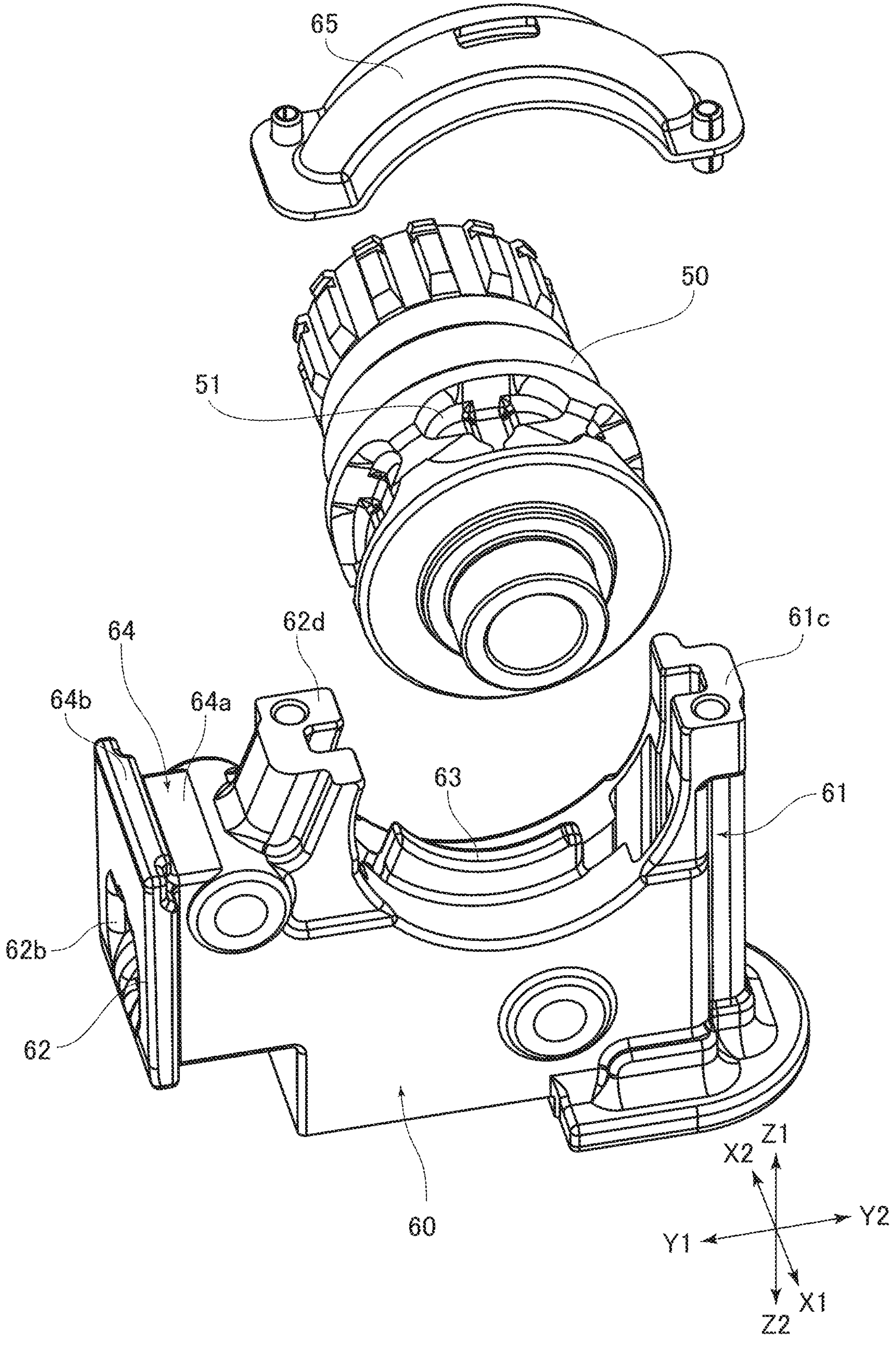
FIG. 5 is a perspective view illustrating configurations of the load sheave, a guide member, and an arc-shaped covering member in the electric chain block illustrated in FIG. 1.

FIG. 5 is a perspective view illustrating configurations of the load sheave 50, the guide member 60, and an arc-shaped covering member 65. As illustrated in FIG. 3 and FIG. 5, the guide member 60 is provided with a first guide part 61, a second guide part 62, a chain restriction part 63, and a locking part 64. The first guide part 61 is a portion which well guides the movement of the load chain C1 extending toward the lower hook 80 side (Z2 side). The first guide part 61 is provided with a first through passage 61*a* extending in the vertical direction (Z-direction), and a bottom surface chain inlet/outlet 61*b* on the lower end side (Z2 side) of the first through passage 61*a* in the normal suspension. Note that the first through passage 61*a* has a plane (XY plane) perpendicular to the vertical direction (Z-direction) forming an almost cross shape corresponding to the movement of the load chain C1. Accordingly, the bottom surface chain inlet/outlet 61*b* is opened also in an almost cross shape.

Further, an opposed cover part 61*c* is provided on the upper side (Z1 side) of the first guide part 61 in the normal suspension. The opposed cover part 61*c* is provided on the same axial line in the vertical direction (Z-direction) with the first through passage 61*a*, and its section on the load sheave 50 side forms a shape obtained by notching the first through passage 61*a*. The opposed cover part 61*c* covers the load sheave 50 in a state of not hindering the movement of the load chain C1 at the first position being a position where the load chain C1 guided from the first through passage 61*a* is attached to and detached from the load sheave 50. Accordingly, the opposed cover part 61*c* prevents the load chain C1 from trying to come off the load sheave 50. Further, the opposed cover part 61*c* enables the load chain C1 to smoothly move between itself and the first through passage 61*a*.

Note that, as illustrated in FIG. 5, the arc-shaped covering member 65 is mounted to the upper end side of the opposed cover part 61*c* and a later-explained opposed cover part 62*d* via a fixing member such as a screw or a pin. This prevents the load chain C1 from coming off the load sheave 50 on the upper side (Z1 side) in the normal suspension than the guide member 60.

Besides, the second guide part 62 is a portion which well guides the movement of the load chain C1 extending toward the chain bucket 90 (namely, the side surface 31 side of the body 30 constituting the main body part 20). The second guide part 62 is provided with a second through passage 62*a* having a cross-section in an almost cross shape as with the above first through passage 61*a*. A skew part exists obliquely downward from the load sheave 50 toward the side surface 31 and a transverse part exists from the skew part toward the side surface 31 in the normal suspension of the second through passage 62*a*, and they are smoothly connected.

Note that the second guide part 62 is also provided with the opposed cover part 62*d* forming a shape obtained by notching the second through passage 62*a* as with the above-explained opposed cover part 61*c*. The opposed cover part 62*d* covers the load sheave 50 in a state of not hindering the movement of the load chain C1 at the second position being a position where the load chain C1 guided from the second through passage 62*a* is attached to and detached from the load sheave 50. Accordingly, the opposed cover part 62*d* prevents the load chain C1 from trying to come off the load sheave 50.

Note that the side surface 31 of the body 30 is provided with a side surface chain entry/exit port 62*b* being an entry/exit port for the load chain C1 at the second guide part 62. The side surface chain entry/exit port 62*b* is opened also in an almost cross shape as with the cross-sectional shape of the second through passage 62*a*.

Further, the chain restriction part 63 is provided at a section of the guide member 60 opposing the load sheave 50 and between the first guide part 61 and the second guide part 62. The chain restriction part 63 is a projecting portion in an arc shape which enters the inside of the chain pocket 51 on the no-load side of the load sheave 50 in a state of not hindering the rotation of the load sheave 50. The chain restriction part 63 narrows the minimum gap with respect to the bottom portion of the chain pocket 51 to an extent of interfering with the metal ring of the load chain C1 entered a vertical groove and a transverse groove of the chain pocket 51. Thus, it is possible to prevent problems such as chains stopping moving (getting stuck) due to the metal ring going from the first guide part 61 to the second guide part 62 on the no-load side of the load sheave 50.

Further, in the normal suspension, the locking part 64 is provided on the upper side (Z1 side) of the second guide part 62. The locking part 64 is a portion on which a hooking part 103*a* (later explained) of the bucket-mounting bracket 100 is hooked. To enable the hooking, the locking part 64 is provided with a locking recessed part 64*a* and a locking projecting part 64*b*. The locking projecting part 64*b* is a portion projecting to the upper side (Z1 side) than the locking recessed part 64*a* in the normal suspension. Accordingly, when the hooking part 103*a* of the movement restriction part 103 enters the locking recessed part 64*a*, the hooking part 103*a* can come into contact with the surface (inner wall surface) of the locking projecting part 64*b* on the locking recessed part 64*a* side. Accordingly, when a force in a direction of separating from the side surface 31 acts on the bucket-mounting bracket 100, the hooking part 103*a* collides with the inner wall surface. This makes it possible to resist the force in the direction of separating from the side surface 31 on the one end side (Z2 side) of the bucket-mounting bracket 100.

Note that the first guide part 61, the second guide part 62, the chain restriction part 63, and the locking part 64 are integrally provided, but they may be formed as separate parts and the separate parts may be assembled.

<Regarding the Upper Hook 70 and the Link Shaft S1>

As illustrated in FIG. 3, to the body 30, the upper hook 70 is mounted via the link shaft S1. The link shaft S1 is a shaft member to be inserted into the above shaft hole 34. Besides, the upper hook 70 includes a hook part 71 and a hook receiving part 72. The hook part 71 is a portion on which a cargo, a ceiling or the like is hung. Further, the hook receiving part 72 is a portion which rotatably supports the hook part 71. The hook receiving part 72 is provided with a mounting hole 72*a* which penetrates the hook receiving part 72 in the Y direction. Into the mounting hole 72*a*, the link shaft S1 is inserted. Thus, the upper hook 70 is supported by the main body part 20 (body 30) via the link shaft S1.

<Regarding the Lower Hook 80>

The lower hook 80 is coupled to a lower end side (Z2 side) of the load chain C1 fed from the bottom surface chain inlet/outlet 61*b* of the first through passage 61*a* of the guide member 60.

<Regarding the Chain Bucket 90>

As illustrated in FIG. 1, the chain bucket 90 is a bucket-shaped portion for housing the load chain C1 discharged from the side surface chain entry/exit port 62*b*. The chain bucket 90 is formed of resin or cloth, as a material, which has flexibility while sufficiently bearing the weight of the load chain C1. The chain bucket 90 is mounted to the bucket-mounting bracket 100 via a carabiner, a wire, or another coupling tool 110. Therefore, the chain bucket 90 is in a state of being mounted to the main body part 20 (the body 30 and the guide member 60) via the coupling tool 110 and the bucket-mounting bracket 100.

<Regarding the Bucket-Mounting Bracket 100>

Figure 6:
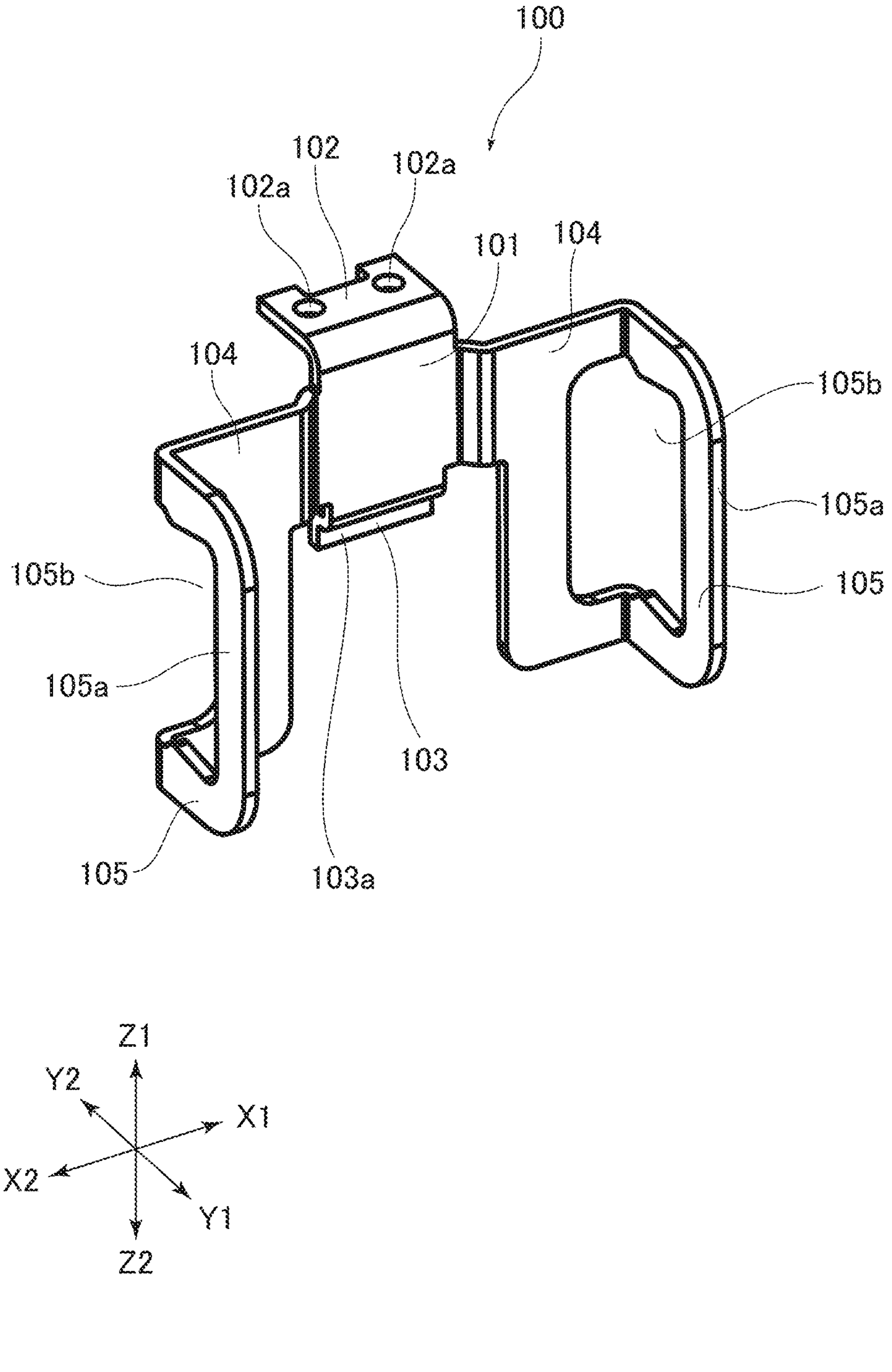
FIG. 6 is a perspective view illustrating a configuration of a bucket-mounting bracket in the electric chain block illustrated in FIG. 1.

FIG. 6 is a perspective view illustrating the configuration of the bucket-mounting bracket 100. As illustrated in FIG. 3 and FIG. 6, the bucket-mounting bracket 100 is provided with a side surface contact part 101, the fixing flange part 102, the movement restriction part 103, a main body protection part 104, and a bucket-mounting part 105. Note that the bucket-mounting bracket 100 illustrated in FIG. 3 and FIG. 6 can be formed by bending one metal plate, for example, by press working.

The side surface contact part 101 of them is a portion which comes into contact with the side surface of the main body part 20 (the side surface of the guide member 60 in this embodiment). Note that the side surface contact part 101 may be a portion which comes into contact with the side surface 31 of the body 30. In this embodiment, in the inverted suspension state, the side surface contact part 101 can guide the load chain C1 fed out from the side surface chain entry/exit port 62*b* going to the chain bucket 90 and guide the load chain C1 entering toward the side surface chain entry/exit port 62*b*. To enable the guides, the side surface contact part 101 is recessed toward the side surface 31 more than the later-explained main body protection part 104, thus making the load chain C1 more easily pass through the side surface contact part 101 than the other section in the inverted suspension state. For this reason, the side surface contact part 101 is arranged on the upper side in the inverted suspension state (the lower side in the normal suspension; Z2 side) with respect to the side surface chain entry/exit port 62*b*.

Besides, the fixing flange part 102 is a portion extending in a direction crossing (in FIG. 6, almost perpendicular to) the side surface contact part 101. The fixing flange part 102 is provided with two insertion holes 102*a* in FIG. 6, but any number of the insertion holes 102*a* may be provided. The insertion hole 102*a* is a portion which is brought into contact with the above mounting seat 35 and fixes the upper side (Z1 side) of the bucket-mounting bracket 100 to the body 30 by screwing a screw into the screw hole 35*c* of the boss 35*a* in that state.

Note that the fixation of the fixing flange part 102 is not limited to the screw. For example, a pin member such as a snap pin or a retainer pin may be used as a fixing means. In this case, it is preferable to form, in the boss 35*a*, an insertion hole in place of the screw hole 35*c*. Further, a boss may be formed in the fixing flange part 102 and inserted into the insertion hole of the boss 35*a*. Further, the boss 35*a* may be inserted into the insertion hole 102*a*.

Besides, a cover member 37 is mounted to the shaft recessed part 33 in order to make the screw invisible (blindfold) from the outside. The cover member 37 is provided with a not-illustrated stepped insertion hole, and a screw is inserted into the insertion hole. In this event, the head portion of the screw is received at the stepped portion of the stepped insertion hole, and the screw is in a state of not exposing to the outside. Accordingly, the cover member 37 brings about a state in which the screw is not exposed.

Besides, the movement restriction part 103 is a portion which is locked to the above locking part 64 and thereby prevents the bucket-mounting bracket 100 from moving. In the configuration illustrated in FIG. 6, the movement restriction part 103 is bent so as to form a step shape from the side surface contact part 101 toward the Y2 side. Thus, the movement restriction part 103 is provided with the hooking part 103*a* which comes into contact with the inner wall side of the above locking projecting part 64*b*. The hooking part 103*a* is provided to be almost parallel with the side surface contact part 101. Accordingly, when the force in a direction separating from the side surface 31 (a tensile force in the Y1 direction) acts on the bucket-mounting bracket 100, the hooking part 103*a* collides with the inner wall of the locking projecting part 64*b*, thus making it possible to resist the above tensile force.

Besides, the main body protection parts 104 are provided on both sides of the above side surface contact part 101 in the width direction. The main body protection part 104 is a portion which prevents the load chain C1 coming off the side surface contact part 101 from coming into contact with the side surface 31 of the body 30.

Note that the main body protection part 104 projects in a direction separating from the side surface 31 more than the side surface contact part 101, and thereby well prevents the load chain C1 from coming into contact with the side surface 31 even if the load chain C1 largely tilts with the side surface chain entry/exit port 62*b* as a fulcrum.

Further, on the end portion side of the main body protection part 104, the bucket-mounting part 105 is provided. The bucket-mounting part 105 is a portion to which the chain bucket 90 is mounted via the coupling tool 110. In this embodiment, the bucket-mounting part 105 includes a mounting arm 105*a* in an almost U-shape, and the mounting arm 105*a* is coupled, at its both end sides, to the main body protection part 104. Thus, a mounting hole 105*b* surrounded by the main body protection part 104 and the mounting arm 105*a* is formed.

Note that the mounting hole 105*b* has a predetermined length along the Z-direction (namely, in a long hole shape along the Z-direction). In the normal suspension, the coupling tool 110 is located on the Z2 side (lower side) of the mounting hole 105*b*, and the chain bucket 90 can be mounted via the coupling tool 110. On the other hand, in the inverted suspension, the coupling tool 110 is located on the Z1 side (upper side in the normal suspension) of the mounting hole 105*b*, and the chain bucket 90 can be mounted via the coupling tool 110. Accordingly, in both cases of the normal suspension and the inverted suspension, the load chain C1 hanging down due to the self weight can be well housed in the chain bucket 90.

<Regarding the Operation and Effects>

The electric chain block 10 having the above configuration includes: the bucket-mounting bracket 100 including the bucket-mounting part 105 to which the chain bucket 90 for housing the load chain C1 on the no-load side is mounted; and the fixing means for fixing the bucket-mounting bracket 100 to the main body part 20. Further, the main body part 20 is provided with the side surface chain entry/exit port 62*b* for the load chain C1 on the no-load side to enter/exit the inside of the main body part 20 from/to the side surface of the main body part 20, and the shaft recessed part 33 in which the shaft hole 34 for inserting the linking shaft S1 for mounting the upper hook 70 to the main body part 20 opens, and which is recessed from the side surface.

Further, the bucket-mounting bracket 100 is provided with the side surface contact part 101 which comes into contact with the side surface, the fixing flange part 102 which projects in a direction crossing the side surface contact part 101, and the bucket-mounting part 105 which projects to the opposite side to the fixing flange part 102. Further, in the shaft recessed part 33, the mounting seat 35 which the fixing flange part 102 is brought into contact with and fixed to by the fixing means, is provided in the direction crossing the internal side surface 33*a* (first wall surface) in which the shaft hole 34 opens.

In the case of the above configuration, the bucket-mounting bracket 100 can be fixed to the mounting seat 35 of the shaft recessed part 33 via the fixing means. Accordingly, the fixing flange part 102 is fixed by the fixing means in a state of being in contact with the mounting seat 35 of the shaft recessed part 33 recessed from the side surface, so that an uneven portion on the side surface of the main body part 20 can be only the bucket-mounting part 105. This can bring about a neat state with less uneven portion on the side surface of the main body part 20, resulting in higher design quality.

Further, in the electric chain block 10 in this embodiment, the side surface chain entry/exit port 62*b* is provided on the side surface of the main body part 20. Therefore, the entry/exit port for the load chain C1 on the no-load side is not located at the bottom surface of the body 30, thus eliminating the need to largely curve the load chain C1 on the no-load side. This eliminates the need to provide the arc-shaped guide (3) as disclosed in Patent Literature 1. Accordingly, the bucket-mounting bracket 100 in this embodiment can be made compact as compared with the bracket (12) disclosed in Patent Literature 1. Further, since the side surface chain entry/exit port 62*b* exists at the side surface of the main body part 20, the side surface chain entry/exit port 62*b* is located on the upper hook 70 side (Z1 side) as compared with the configuration of Patent Literature 1. Therefore, in the inverted suspension state, it is possible to bring the load chain C1 on the no-load side close to the chain bucket 90 side, and accordingly improve the storability of the load chain C1 into the chain bucket 90.

Further, in this embodiment, when the fixing flange part 102 is fixed to the mounting seat 35 by the fixing means, the fixing flange part 102 is arranged at a position where the fixing flange part 102 interferes with the axial direction of the shaft hole 34.

In the case of the above configuration, even if the linking shaft S1 inserted in the shaft hole 34 tries to come off the shaft hole 34 in the fixed state of the bucket-mounting bracket 100, the fixing flange part 102 interferes with the end portion of the linking shaft S1. This hinders the linking shaft S1 from coming off the shaft hole 34. Accordingly, it becomes possible to reduce parts for preventing the linking shaft S1 from coming off the shaft hole 34 in the electric chain block 10, and achieve the reductions in cost and weight of the electric chain block 10.

Further, in this embodiment, the mounting seat 35 is the end face part 35*b* of the boss 35*a* projecting from the bottom surface 33*b* of the shaft recessed part 33, and the pair of bosses 35*a* are provided in the state of not hindering the insertion of the linking shaft S1 into the shaft hole 34 and across the opening 34*a*.

In the case of the above configuration, in the state before the fixing flange part 102 is fixed to the mounting seat 35 (end face part 35*b* of the boss 35*a*), the insertion property of the linking shaft S1 into the shaft hole 34 is not hindered. On the other hand, in the case where the fixing flange part 102 is fixed to the mounting seat 35 (end face part 35*b* of the boss 35*a*), the linking shaft S1 is hindered from coming off the shaft hole 34. Therefore, it becomes possible to achieve both disassembling/assembling of the electric chain block 10 and sure prevention of coming-off of the linking shaft S1, with a simple configuration.

Further, in this embodiment, the main body part 20 is provided with the locking part 64 which opens on a side closer to the shaft recessed part 33 than the side surface chain entry/exit port 62*b* and to which a part of the bucket-mounting bracket 100 is locked. Further, the bucket-mounting bracket 100 is provided with the movement restriction part 103 which projects to the inner side of the main body part 20 more than the side surface contact part 101 and is locked to the locking part 64.

As explained above, the movement restriction part 103 is locked to the locking part 64, so that the bucket-mounting bracket 100 is brought into a state of being fixed to the main body part 20 by the fixing flange part 102 and the movement restriction part 103 apart from the fixing flange part 102 across the side surface contact part 101. Therefore, even when a tensile force in a direction away from the side surface 31 acts on the bucket-mounting bracket 100, it becomes possible to resist the above tensile force. Accordingly, if the chain bucket 90 is dragged in a state of gripping the main body part 20, it becomes possible to prevent deformation such as large bending of the bucket-mounting bracket 100.

Further, in this embodiment, the movement restriction part 103 is provided with the hooking part 103*a* which projects to the inner side of the main body part 20 via the step with respect to the side surface contact part 101. Further, the locking part 64 is provided with the locking recessed part 64*a* and the locking projecting part 64*b*, the locking recessed part 64*a* is a portion which the hooking part 103*a* enters, and the locking projecting part 64*b* is provided projecting from the locking recessed part 64*a*. In addition, the hooking part 103*a* comes into contact with the inner wall surface of the locking projecting part 64*b* on the locking recessed part 64*a* side to restrict movement of the bucket-mounting bracket 100 in a direction away from the side surface of the main body part 20.

In the case of the above configuration, even if the movement restriction part 103 side is not fixed with a screw or the like, the hooking part 103*a* comes into contact with the inner wall surface of the locking projecting part 64*b* on the locking recessed part 64*a* side, thereby making it possible that even if the above-explained tensile force in a direction away from the side surface 31 acts, the bucket-mounting bracket 100 can resist the tensile force. Accordingly, it becomes possible to reduce the number of parts such as screws while preventing the deformation of the bucket-mounting bracket 100, and to achieve further reductions in cost and weight of the electric chain block 10.

Further, in this embodiment, the bucket-mounting parts 105 have the mounting arms 105*a* projecting in directions away from the side surfaces on both end sides of the side surface contact part 101 in the width direction perpendicular to the vertical direction in which the cargo is raised and lowered, and have the mounting holes 105*b* surrounded by the mounting arms 105*a*. The chain bucket 90 is supported via the coupling tool 110 inserted into the mounting holes 105*b*.

Therefore, it becomes possible to change the section where the coupling tool 110 is arranged with respect to the mounting holes 105*b*. In other words, in the case where the coupling tool 110 is located on the Z2 side of the mounting holes 105*b*, the chain bucket 90 can be mounted in the state corresponding to the normal suspension. Besides, in the case where the coupling tool 110 is located on the Z1 side of the mounting holes 105*b*, the chain bucket 90 can be mounted in the state corresponding to the inverted suspension. The chain bucket 90 can be mounted in a state corresponding to both the normal suspension and the inverted suspension of the electric chain block 10.

Further, in the case where a swing of largely tilting the load chain C1 is about to occur, the load chain C1 interferes with the mounting arm 105*a*. Therefore, the presence of the mounting arm 105*a* can restrict the swing of the load chain C1. Further, the load chain C1 can be brought into a state of being located between the mounting holes 105*b* on both end sides (namely, in pair) in the width direction, thus making it possible to prevent the load chain C1 from largely swinging and coming into contact with the main body part 20. Therefore, it is possible to prevent the load chain C1 from damaging the main body part 20. In particular, in the case where the body 30 (part of the main body part 20) is formed of an aluminum-based metal softer than the load chain C1, it becomes possible to well prevent the damage from occurring to the body 30.

Further, in this embodiment, the main body part 20 includes the body 30 which houses the motor 40, and the guide member 60 which is integrally mounted to the body 30, and the guide member 60 is provided with: the first guide part 61 which guides the load chain C1 toward the lower hook 80; and the second guide part 62 which includes the side surface chain entry/exit port 62*b* and guides the load chain C1 toward the side surface chain entry/exit port 62*b*. Further, the guide member 60 includes the chain restriction part 63 which is provided between the first guide part 61 and the second guide part 62, enters the chain pocket 51 of the load sheave 50 in a state of not hindering the rotation of the load sheave 50, and hinders the load chain C1 from moving between the first guide part 61 and the second guide part 62 on the no-load side of the load sheave 50.

The chain restriction part 63 exists as above hinders the load chain C1 from moving between the first guide part 61 and the second guide part 62. Thus, it is possible to prevent problems such as chains stopping moving (getting stuck)

due to the metal ring going from the first guide part 61 to the second guide part 62 on the no-load side of the load sheave 50.

Further, in this embodiment, the locking part 64 is located above the side surface chain entry/exit port 62*b* of the guide member 60 in the normal suspension. Therefore, a section corresponding to the locking part 64 does not need to be provided using a separate part or the like, thus making it possible to reduce the number of parts. Accordingly, it becomes possible to achieve further reductions in cost and weight of the electric chain block 10.

One embodiment of the present invention has been explained above, and the present invention can be modified other than that. Hereinafter, the modified one will be explained.

Figure 7:
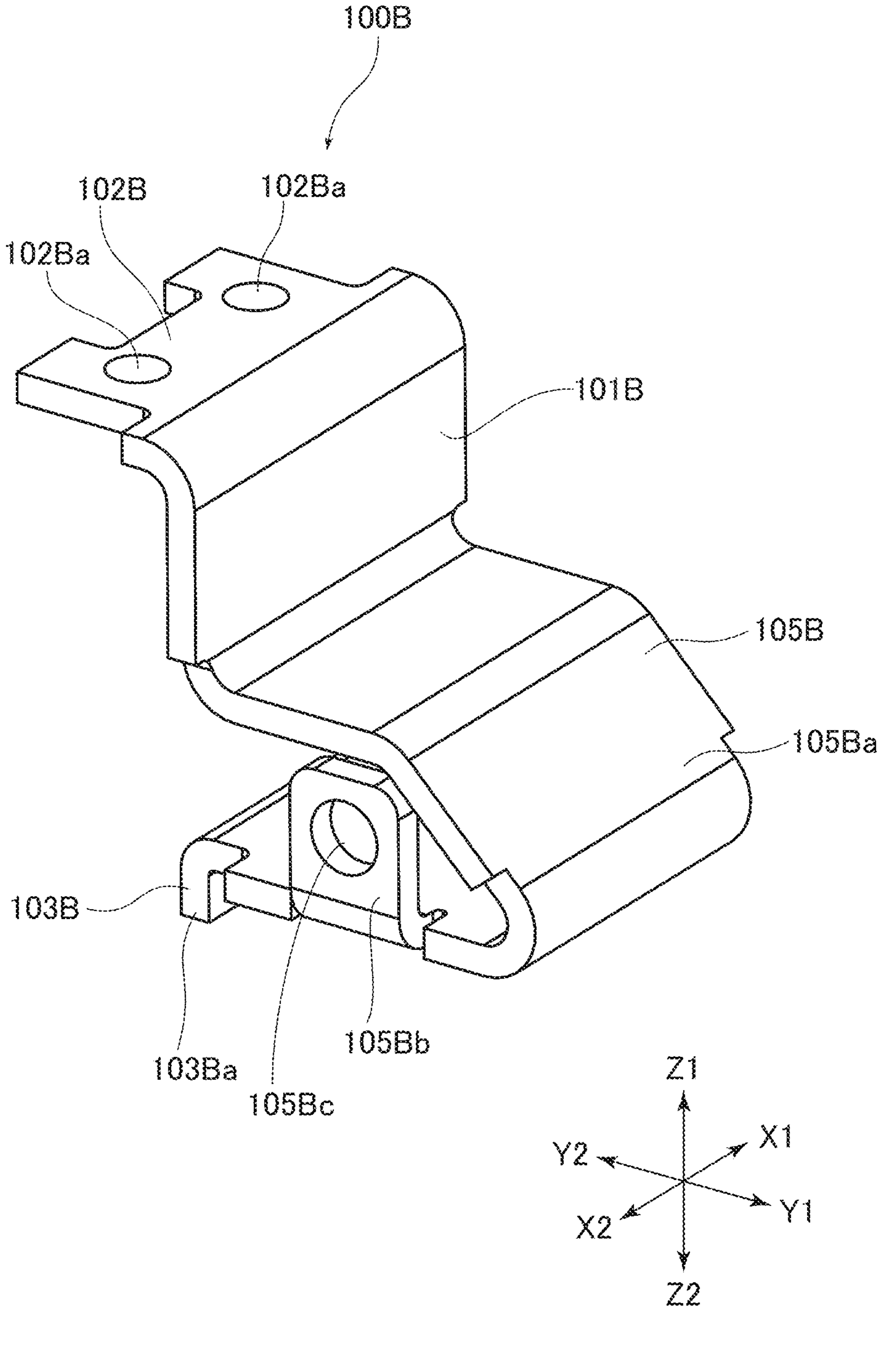
FIG. 7 is a perspective view illustrating a configuration of a bucket-mounting bracket according to a modification example of the present invention.
Figure 8:
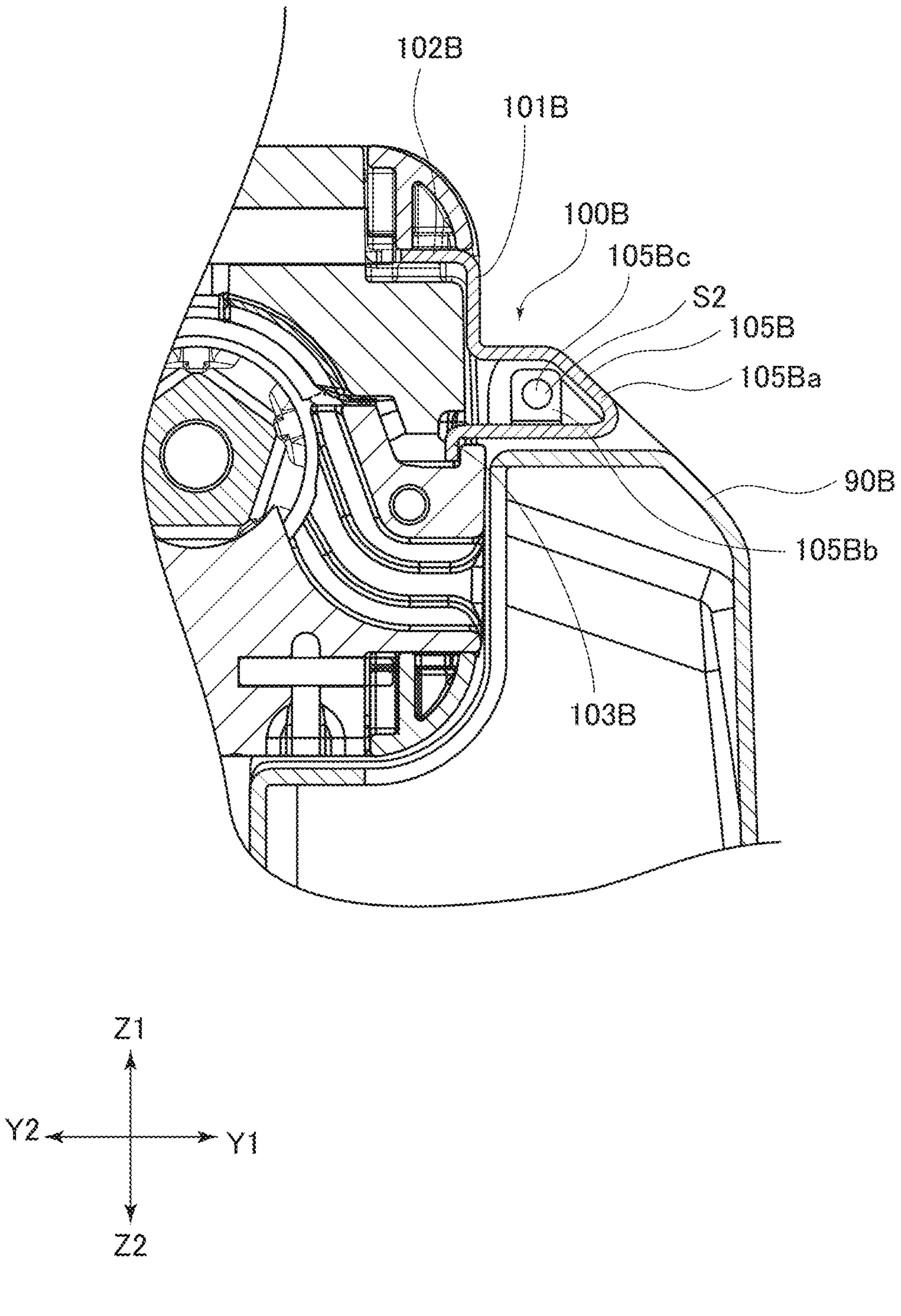
FIG. 8 is a partial cross-sectional view of the electric chain block illustrating a configuration in the vicinity of a chain bucket in a state where the bucket-mounting bracket illustrated in FIG. 7 is mounted.

In place of the bucket-mounting bracket 100 in the above embodiment, a bucket-mounting bracket 100B illustrated in FIG. 7 and FIG. 8 may be used. FIG. 7 is a perspective view illustrating a configuration of the bucket-mounting bracket 100B according to the modification example of the present invention. FIG. 8 is a partial cross-sectional view of the electric chain block 10 illustrating the configuration in the vicinity of the chain bucket 90 in a state where the bucket-mounting bracket 100B illustrated in FIG. 7 is mounted.

As illustrated in FIG. 7 and FIG. 8, the bucket-mounting bracket 100B is provided with a side surface contact part 101B, a fixing flange part 102B, and a movement restriction part 103B similar to the side surface contact part 101, the fixing flange part 102, and the movement restriction part 103 in the above bucket-mounting bracket 100. Further, the bucket-mounting bracket 100B includes a bucket-mounting part 105B, and the bucket-mounting part 105B has a mounting base part 105Ba projecting in a direction away from the side surface of the main body part 20 at the end portion (end portion on the Z2 side) of the side surface contact part 101B on the side surface chain entry/exit port 62*b* side.

Note that in this embodiment, the mounting base part 105Ba is present between the side surface contact part 101B and the movement restriction part 103B.

The mounting base part 105Ba is provided with a support shaft part 105Bb which a shaft hole 105Bc penetrates, and a chain bucket 90B is supported via a bucket support shaft S2 inserted into the shaft hole 105Bc. In the case of this configuration, the bucket-mounting part 105B projecting from the side surface of the main body part 20 is provided on the upper side (Z1 side) of the side surface chain entry/exit port 62*b*, so that when the electric chain block 10 is used in the inverted suspension state, the load chain C1 collides with the bucket-mounting part 105B. For this reason, it is difficult to use the electric chain block 10 in the inverted suspension state. However, it is possible to well mount the chain bucket 90B to the main body part 20 by a bucket-mounting bracket 100B in the normal suspension state.

Note that also in the case of using the bucket-mounting bracket 100B as illustrated in FIG. 7 and FIG. 8, the fixing flange part 102B interferes with the end portion of the linking shaft S1 in the fixed state of the bucket-mounting bracket 100B to hinder the link shaft S1 form coming off the shaft hole 34. This eliminates the need of a part for preventing the link shaft S1 form coming off the shaft hole 34, thereby making it possible to achieve the reductions in cost and weight of the electric chain block 10.

Further, the bucket-mounting bracket 100B as illustrated in FIG. 7 and FIG. 8 can be made compact as compared with the bracket (12) disclosed in Patent Literature 1. In addition, it is possible to support the chain bucket 90B via the support shaft part 105Bb and the bucket support shaft S2 which are located on the upper side (Z1 side) than the side surface chain entry/exit port 62*b*. Therefore, the chain bucket 90B can be mounted in a state of covering the side surface chain entry/exit port 62*b* as illustrated in FIG. 8. This can improve the storability of the load chain C1 into the chain bucket 90B.

Note that in the above embodiment and the modification example, a configuration in which the movement restriction parts 103, 103B are omitted from the bucket-mounting brackets 100, 100B may be employed.

REFERENCE SIGNS LIST

10 . . . chain block, 20 . . . main body part, 30 . . . body, 31 . . . side surface, 32 . . . top surface, 33 . . . shaft recessed part, 33*a* . . . internal side surface (corresponding to first wall surface), 33*b* . . . bottom surface, 34 . . . shaft hole, 34*a* . . . opening, 35 . . . mounting seat, 35*a* . . . boss, 35*b* . . . end face part, 35*c* . . . screw hole, 37 . . . cover member, 40 . . . motor, 50 . . . load sheave, 51 . . . chain pocket, 60 . . . guide member, 61 . . . first guide part, 61*a* . . . first through passage, 61*b* . . . bottom surface chain inlet/outlet, 61*c* . . . opposed cover part, 62 . . . second guide part, 62*a* . . . second through passage, 62*b* . . . side surface chain entry/exit port, 62*d* . . . opposed cover part, 63 . . . chain restriction part, 64 . . . locking part, 64*a* . . . locking recessed part, 64*b* . . . locking projecting part, 65 . . . arc-shaped covering member, 70 . . . upper hook, 71 . . . hook part, 72 . . . hook receiving part, 72*a* . . . mounting hole, 80 . . . lower hook, 90 . . . chain bucket, 90B . . . chain bucket, 100 . . . bucket-mounting bracket, 100B . . . bucket-mounting bracket, 101 . . . side surface contact part, 101B . . . side surface contact part, 102 . . . fixing flange part, 102B . . . fixing flange part, 102*a* . . . insertion hole, 103 . . . movement restriction part, 103B . . . movement restriction part, 103*a* . . . hooking part, 104 . . . main body protection part, 105 . . . bucket-mounting part, 105B . . . bucket-mounting part, 105Ba . . . mounting base part, 105Bb . . . support shaft part, 105Bc . . . shaft hole, 105*a* . . . mounting arm, 105*b* . . . mounting hole, 110 . . . coupling tool, C1 . . . load chain, S1 . . . link shaft, S2 . . . bucket support shaft

The invention claimed is:

1. An electric chain block for raising or lowering a cargo hung on an upper hook or a lower hook by rotating a load sheave by driving of a motor, the electric chain block comprising:

a main body part including the motor and the load sheave rotated by the motor;

a bucket-mounting bracket including a bucket-mounting part to which a chain bucket for housing a load chain on a no-load side is mounted; and a fixer to fix the bucket-mounting bracket to the main body part, wherein;

the main body part is provided with a side surface chain entry/exit port for the load chain on the no-load side to enter/exit the inside of the main body part from/to a side surface of the main body part, and a shaft recessed part in which a shaft hole for inserting a linking shaft for mounting the upper hook to the main body part opens, and which is recessed from the side surface;

the bucket-mounting bracket is provided with a side surface contact part which comes into contact with the side surface, a fixing flange part which projects in a direction crossing the side surface contact part, and the bucket-mounting part which projects to an opposite side to the fixing flange part; and the shaft recessed part is provided with a mounting seat which the fixing flange part is brought into contact with in a direction crossing a first wall surface in which the shaft hole opens and fixed to by the fixer.

2. The electric chain block according to claim 1, wherein: when the fixing flange part is fixed to the mounting seat by the fixer, the fixing flange part is arranged at a position where the fixing flange part interferes with an axial direction of the shaft hole.

3. The electric chain block according to claim 2, wherein: the mounting seat is an end face part of a boss projecting from a bottom surface of the shaft recessed part; and a pair of the bosses are provided in a state of not hindering insertion of the linking shaft into the shaft bole and across the opening of the shaft hole.

4. The electric chain block according to claim 1, wherein: the main body part is provided with a locking part which opens on a side closer to the shaft recessed part than the side surface chain entry/exit port and to which a part of the bucket-mounting bracket is locked; and the bucket-mounting bracket is provided with a movement restriction part which projects to an inner side of the main body part more than the side surface contact part and is locked to the locking part.

5. The electric chain block according to claim 4, wherein: the movement restriction part is provided with a hooking part which projects to the inner side of the main body part via a step with respect to the side surface contact part; the locking part is provided with a locking recessed part and a locking projecting part; the locking recessed part is a portion which the hooking part enters; the locking projecting part is provided projecting from the locking recessed part; and the hooking part comes into contact with an inner wall surface of the locking projecting part on the locking recessed part side to restrict movement of the bucket-mounting bracket in a direction away from the side surface.

6. The electric chain block according to claim 1, wherein: the bucket-mounting part has mounting arms projecting in directions away from the side surfaces on both end sides of the side surface contact part in a width direction perpendicular to a vertical direction in which the cargo is raised and lowered, and has mounting holes in long hole shapes surrounded by the mounting arms; and the chain bucket is supported via a coupling tool inserted into the mounting holes.

7. The electric chain block according to claim 1, wherein; the bucket-mounting part includes a mounting base part projecting in a direction away from the side surface at an end portion of the side surface contact part on the side surface chain entry/exit port side; and the mounting base part is provided with a support shaft part which a shaft hole penetrates, and the chain bucket is supported via a bucket support shaft inserted into the shaft hole.

8. The electric chain block according to claim 1, wherein: the main body part includes a body which houses the motor, and a guide which is integrally mounted to the body; and the guide includes:

a first guide part which guides the load chain toward the lower hook;

a second guide part which includes the side surface chain entry/exit port and guides the load chain toward the side surface chain entry/exit port; and a chain restriction part which is provided between the first guide part and the second guide part, enters a chain pocket of the load sheave in a state of not hindering rotation of the load sheave, and hinders the load chain from moving between the first guide part and the second guide part on the no-load side of the load sheave.

9. The electric chain block according to claim 8, wherein; a locking part is located above the side surface chain entry/exit port of the guide in a normal suspension.

* * * * *